(12) United States Patent
Horng

(10) Patent No.: US 6,988,447 B1
(45) Date of Patent: Jan. 24, 2006

(54) FRUIT SQUEEZER

(76) Inventor: Ruey-Lan Horng, No. 420, Lane 942, Da-Wan Road, Yung-Kang City, Tainan Hsien (TW)

( * ) Notice: Subject to any disclaimer, the term of this patent is extended or adjusted under 35 U.S.C. 154(b) by 0 days.

(21) Appl. No.: 11/031,083

(22) Filed: Jan. 10, 2005

(51) Int. Cl.
*A23L 1/00* (2006.01)
*A23N 1/00* (2006.01)
*A47J 19/02* (2006.01)

(52) U.S. Cl. ............................ 99/507; 99/506; 99/508; 100/125; 100/213

(58) Field of Classification Search ................ 99/495, 99/501–508, 349, 485, 581; 100/98 R, 213, 100/288, 219, 293, 231, 125, 229 R, 110, 100/131–135; 210/307, 514; D7/665, 666
See application file for complete search history.

(56) References Cited

U.S. PATENT DOCUMENTS

| | | | | |
|---|---|---|---|---|
| 2,238,571 A | * | 4/1941 | Scott ........................... | 99/507 |
| 2,497,335 A | * | 2/1950 | Wissner ........................ | 99/507 |
| 2,624,271 A | * | 1/1953 | Johnson ........................ | 99/506 |
| 2,655,862 A | * | 10/1953 | Mitnick ........................ | 99/507 |
| 2,674,182 A | * | 4/1954 | Kirkpatrick .................. | 99/495 |
| 2,786,502 A | * | 3/1957 | Turner ......................... | 99/595 |
| 4,961,374 A | * | 10/1990 | Lee .............................. | 99/507 |
| 5,520,105 A | * | 5/1996 | Healy ........................... | 99/507 |
| 6,155,164 A | * | 12/2000 | Egana et al. .................. | 99/507 |
| 6,295,921 B1 | * | 10/2001 | Stoev ........................... | 99/507 |
| 6,318,252 B1 | * | 11/2001 | Kao .............................. | 99/495 |
| 6,435,080 B1 | * | 8/2002 | Zarlengo ...................... | 99/510 |
| 6,813,996 B1 | * | 11/2004 | Kao .............................. | 99/507 |

* cited by examiner

*Primary Examiner*—Timothy F. Simone
(74) *Attorney, Agent, or Firm*—Rosenberg, Klein & Lee

(57) ABSTRACT

A fruit squeezer is disclosed. This fruit squeezer forms two transmission movements synchronously in two directions by means of a transmission member to drive the passive pressing cover and the passive rotating member of the fruit squeezer thereby squeezing the fruit by means of forces formed by more than two transmission movements and rotations for obtaining perfect fruit juice.

5 Claims, 6 Drawing Sheets

US 6,988,447 B1

FRUIT SQUEEZER

FIELD OF THE INVENTION

The present invention relates to a fruit squeezer, and more particularly to a utensil for obtaining fruit juice by means of squeeze method.

BACKGROUND OF THE INVENTION

Because of nutrition and deliciousness, fruit has been become a kind of popular daily food for most people. Moreover, the fruit generates fruit juice by means of processing methods, for example, squeeze, rapid cutting, and water and additives mixing method, wherein the squeeze method is mostly applied to orange and tangerine. The present invention also relates to a fruit squeezer in particular.

This kind of method for squeezing fruit is, for example, disclosed in U.S. Pat. No. 4,711,167 (first reference) and U.S. Pat. No. 4,961,374 (second reference), wherein the squeezing method disclosed in the first reference employs a transmission structure, which is driven by a rotating handle, to squeeze fruit juice out of the fruit in annular direction, e.g. horizontal direction (defined as X-axial direction) and longitudinal direction (defined as Z-axial direction). The second reference employs a transmission structure, which is driven by a rotating handle, to squeeze the fruit in vertical direction (defined as Y-direction). The squeezing operation is completed after collecting the fruit juice.

In these two above-mentioned conventional methods, different directions for exerting pressure are applied to the squeezing process for fruit. Nevertheless, for either one of above-mentioned methods, the requirement for squeezing fruit juice out of the fruit in a three-dimensional space in three directions (i.e. X, Y, and Z axial directions) does not satisfied. Consequentially, it is impossible to make the best use of the squeezer and to squeeze the fruit juice out of the fruit fully.

SUMMARY OF THE INVENTION

In view of the aforementioned problems of the conventional technique, the present inventor provides an improved structure to satisfy the main object for squeezing fruit in a three-dimensional space in three directions (i.e. X, Y, and Z axial directions) thereby squeezing fruit juice out of the fruit fully.

Another object of the present invention is to accomplish the process for squeezing the fruit by means of one action. Furthermore, the preset invention further employs a protrudent rib of a protrudent part with radian to generate spiral rotary cutting and squeezing results during the squeezing process of the fruit thereby further squeezing the fruit juice out of the fruit.

In view of the aforementioned problems of the conventional technique, the present invention designs a fruit squeezer to overcome the foregoing problems. This fruit squeezer comprising:
a base inside which a lateral rod is mounted and a first bevel gear having at least one protrudent driven wall on a side portion thereof is pivotally mounted;
a rotating handle fixed to a first end of the lateral rod of a transmission member and exposed to the outside of the base;
the transmission member comprising:
an upright rack mounted on the inside of the base; and
the lateral rod having a gear corresponding to and engaging with the upright rack, and a second bevel gear corresponding to and engaging with the first bevel gear;
a passive pressing cover fixed to the upright rack, the passive pressing cover having a cambered hollow trench on its bottom; and
a passive rotating member mounted inside the base, the passive rotating member comprising a supporting plate on its upper portion and a corresponding trench on its lower portion corresponding to the protrudent driven wall, the supporting plate comprising a protrudent part corresponding to the cambered hollow trench, the protrudent part comprising at least one protrudent rib on its edge.

The passive pressing cover and the passive rotating member are driven by rotation of the rotating handle that drives the lateral rod to engage the gear and the second bevel gear of the lateral rod with the upright rack and the first bevel gear respectively. Consequently, two transmission movements are formed synchronously in two directions and the passive pressing cover and the passive rotating member of the squeezer are driven by means of a transmission member thereby squeezing the fruit by forces formed by more than two transmission movements and rotations so as to obtain perfect fruit juice.

The other features and preferred embodiments of the present invention will now be described with reference to the accompanying drawings.

DETAILED DESCRIPTION OF THE PREFERRED EMBODIMENT

The content of the present invention will become more apparent for the examiners from the following detailed description when taken in conjunction with the accompanying drawings.

Figure 1:
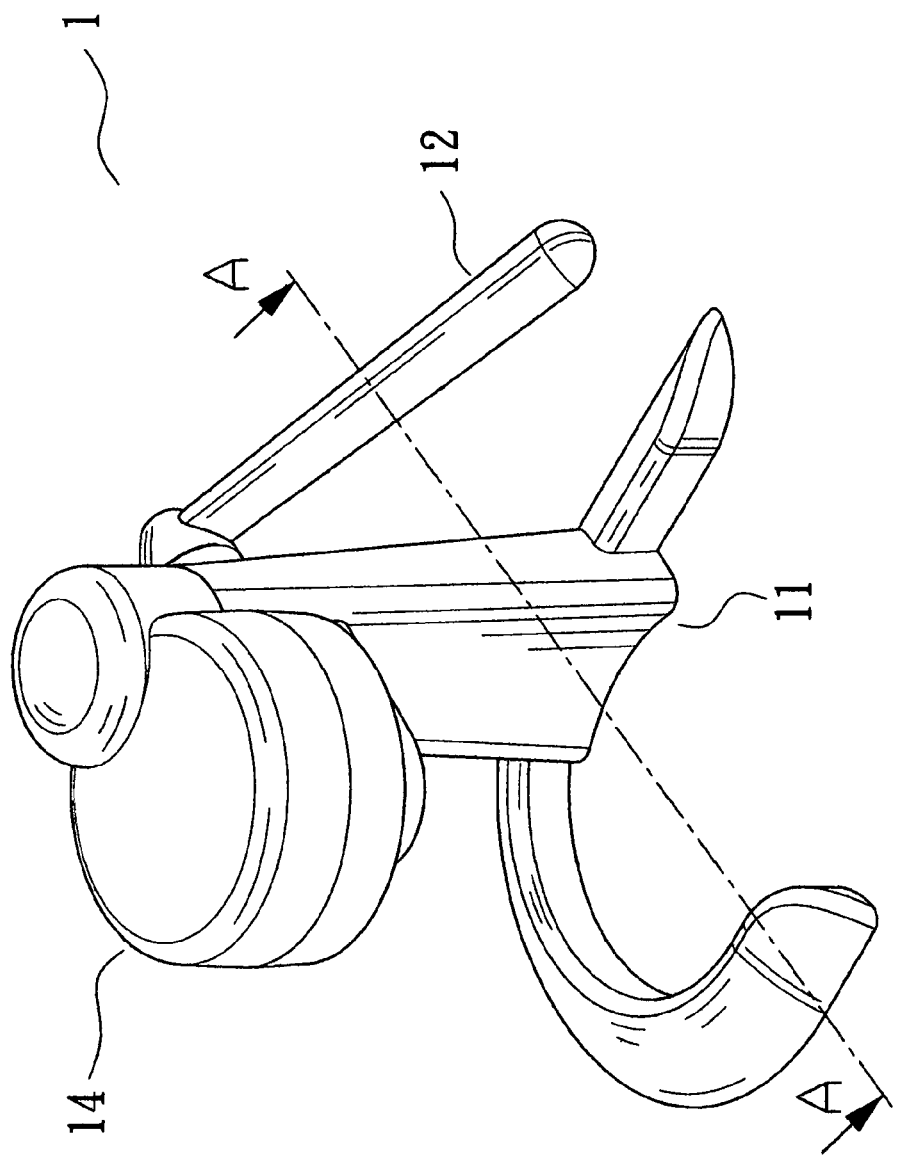
FIG. 1 is an elevation view showing an embodiment of the present invention.
Figure 2:
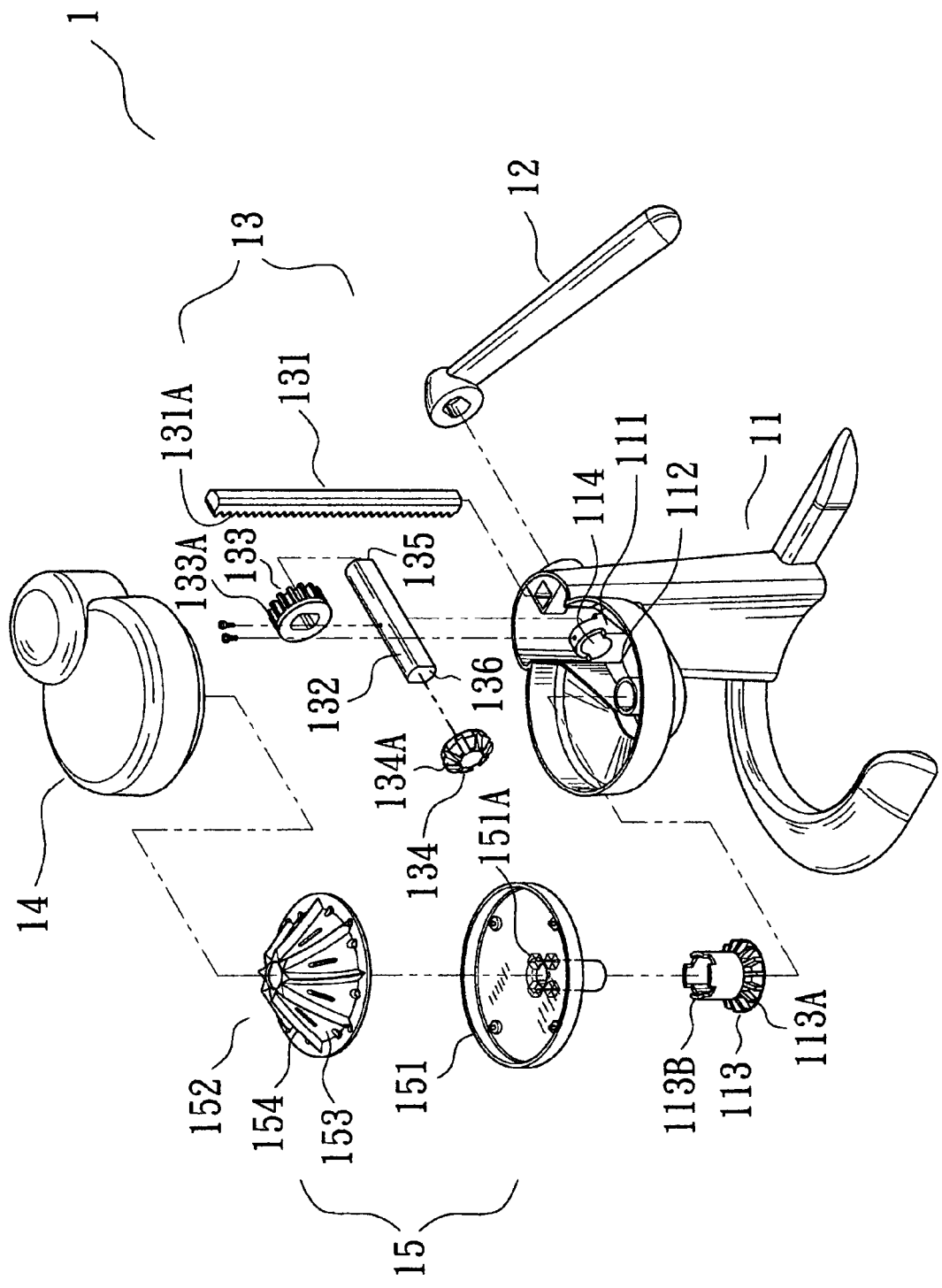
FIG. 2 is an exploded elevation view showing an embodiment of the present invention.

Referring to FIG. 1 and FIG. 2, the present invention relates to a fruit squeezer 1, which comprises: a base 11, a rotating handle 12, a transmission member 13, a passive pressing cover 14, and a passive rotating member 15.

Inside the base 11, a fixing bracket 111 for lateral rod is mounted to allow a lateral rod 132 to penetrate and rotate inside a through hole 114 that forms on the lower portion of the fixing bracket 111. Moreover, a first bevel gear 113 is pivotally mounted inside the base 11. In accordance with this pivotal mounting embodiment, a protrudent sleeve 112 having an upward opening is mounted inside the base 11. The first bevel gear 113 is sleeved onto the outside of the protrudent sleeve 112, wherein the first bevel gear 113 comprises a plurality of convex teeth 113A, and a plurality of protrudent driven walls 113B are mounted on a side portion of the first bevel gear 113.

The rotating handle 12 is fixed to a first end 135 of the lateral rod 132 of the transmission member 13 and exposed to the outside of the base 11.

The transmission member 13 primarily comprises an upright rack 131 on the inside of the base 11, wherein the upright rack 131 comprises a plurality of convex teeth 131A.

The lateral rod 132 is mounted inside the base 11, and a gear 133 having a plurality of convex teeth 133A is mounted in a position close to the first end 135, wherein the convex teeth 133A are disposed to correspond to and engage with the convex teeth 131A of the upright rack 131. A second bevel gear 134 having a plurality of convex teeth 134A is mounted on the lateral rod 132 at a distance away from the gear 133 and close to second end 136 of the lateral rod 132 so as to correspond to and engage with the convex teeth 113A of the first bevel gear 113.

Figure 3:
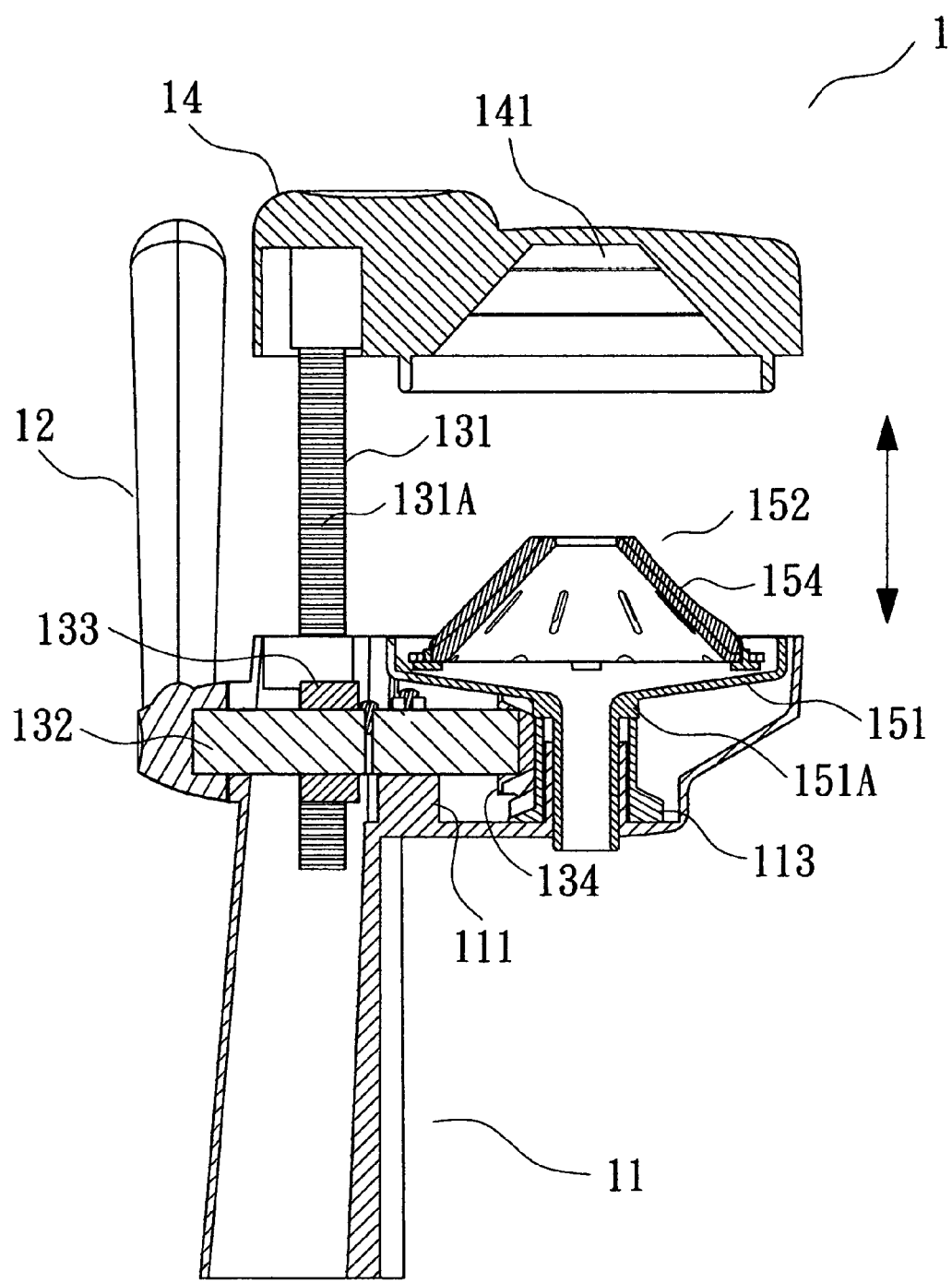
FIG. 3 is a schematic, cross sectional view showing movement of the present invention.

The passive pressing cover 14 is fixed to the upright rack 131 and driven by upward and downward movements of the upright rack 131 to perform corresponding upward and downward movements. As shown in FIG. 3, a cambered hollow trench 141 is formed on the bottom of the passive pressing cover 14 to fit for the profile of general fruit.

The passive rotating member 15 having a rotating plate 151 is mounted inside the base 11, wherein the rotating plate 151 is inserted into protrudent sleeve 112. A corresponding trench 151A is formed on the bottom of the rotating plate 151 in a position corresponding to the protrudent driven walls 113B. Moreover, a supporting plate 152 is assembled on the rotating plate 151 in a position corresponding to the passive pressing cover 14. Furthermore, a protrudent part 153 is mounted on the supporting plate 152, and at least one protrudent rib 154 with radian is formed along the edge of the protrudent part 153 in a position corresponding to the cambered hollow trench 141.

Figure 4:
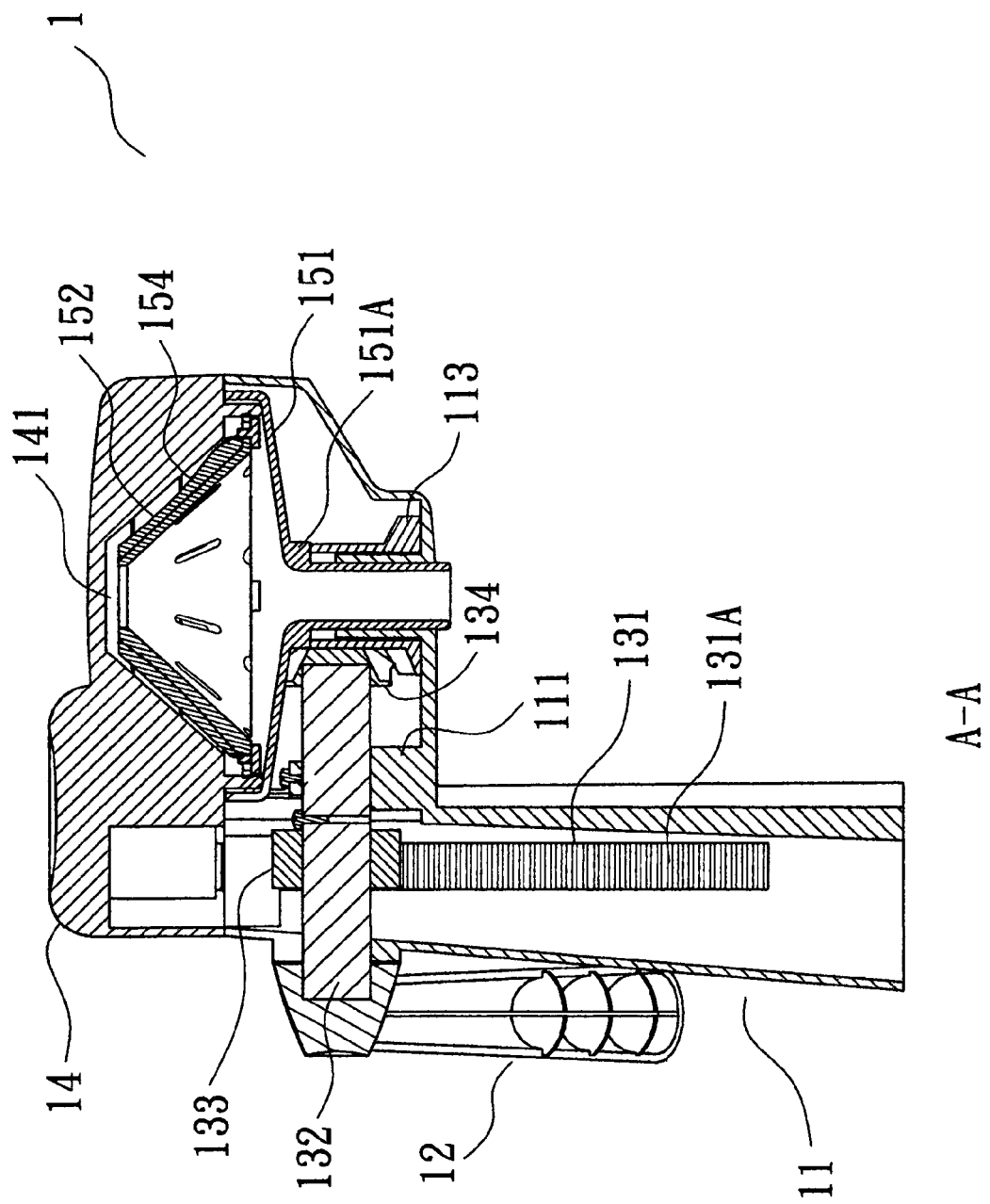
FIG. 4 is a schematic, cross sectional view taken along A—A of FIG. 1 showing another movement of the present invention.
Figure 5:
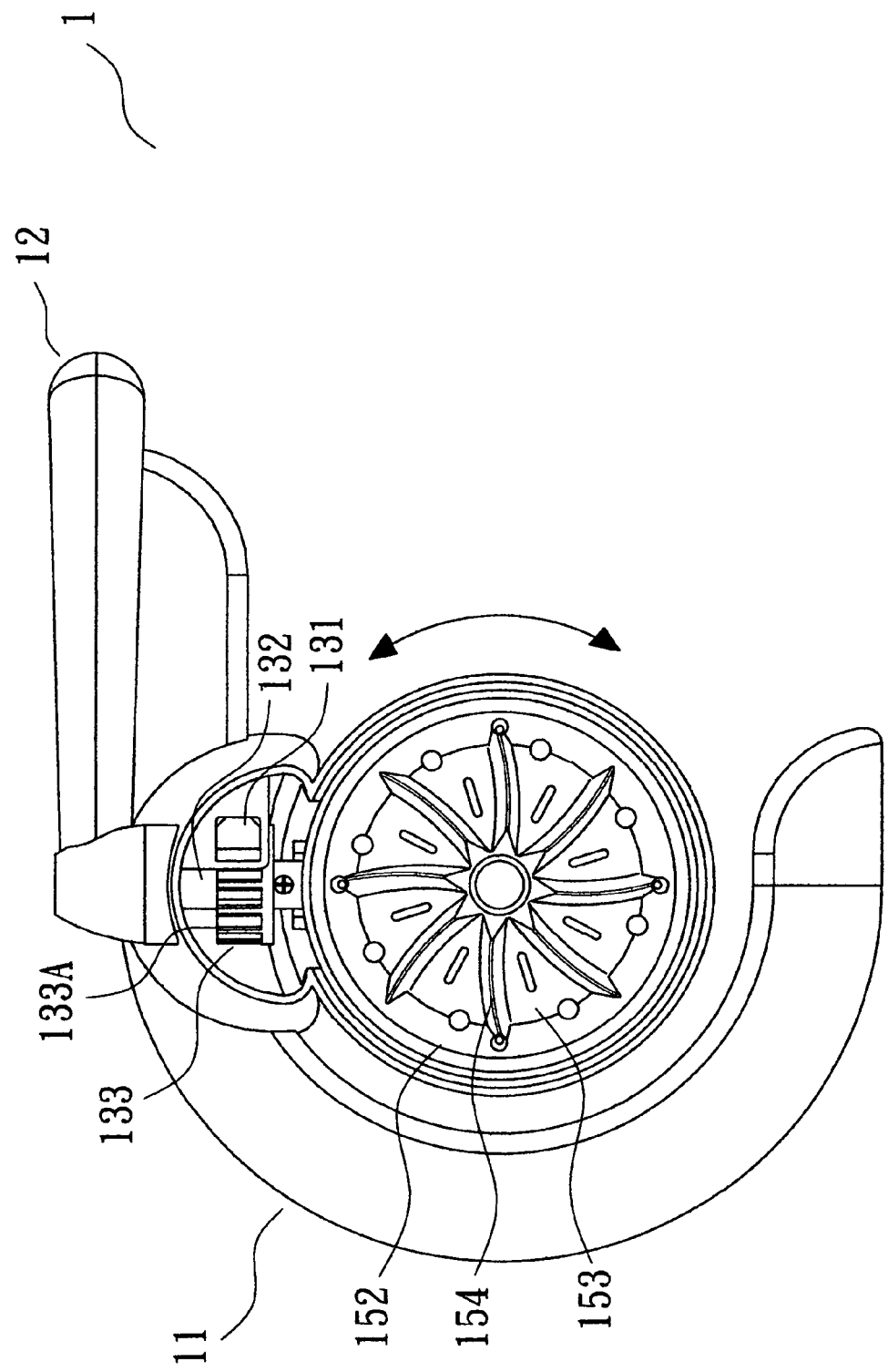
FIG. 5 is a top view showing that a passive pressing cover of the present invention is lifted.

Referring to FIG. 3 through FIG. 5, when user holds and rotates the rotating handle 12, the lateral rod 132 of the transmission member 13 is driven by the rotating handle 12 to perform rotation, and the upright rack 131 is driven by the gear 133 of the lateral rod 132 to move upwardly and downwardly, wherein the gear 133 comprises the convex teeth 133A that corresponds to and engages with the convex teeth 131A of the upright rack 131. Moreover, since the passive pressing cover 14 is fixed to the upright rack 131, it is also driven by the upward and downward movements of the upright rack 131 to perform corresponding movements in the same direction. At this moment, if a fruit is disposed on the supporting plate 152, the fruit is squeezed in vertical direction (i.e. Y-axial direction).

Furthermore, the convex teeth 134A of the second bevel gear 134 on the lateral rod 132 corresponds to and engages with the convex teeth 113A of the first bevel gear 113 since the lateral rod 132 of the transmission member 13 is interactively driven by the rotation of the rotating handle 12. Accordingly, the first bevel gear 113 is driven to perform rotation and drive the corresponding trench 151A formed on the bottom of the rotating plate 151 by means of the protrudent driven walls 113B thereby interactively rotating the rotating plate 151 and the supporting plate 152. Besides, the fruit is also squeezed in annular direction by the protrudent rib 154 that mounts on the edge of the protrudent part 153 (i.e. X-axial direction and Z-axial direction) so as to fully squeeze the fruit in every direction.

Figure 6:
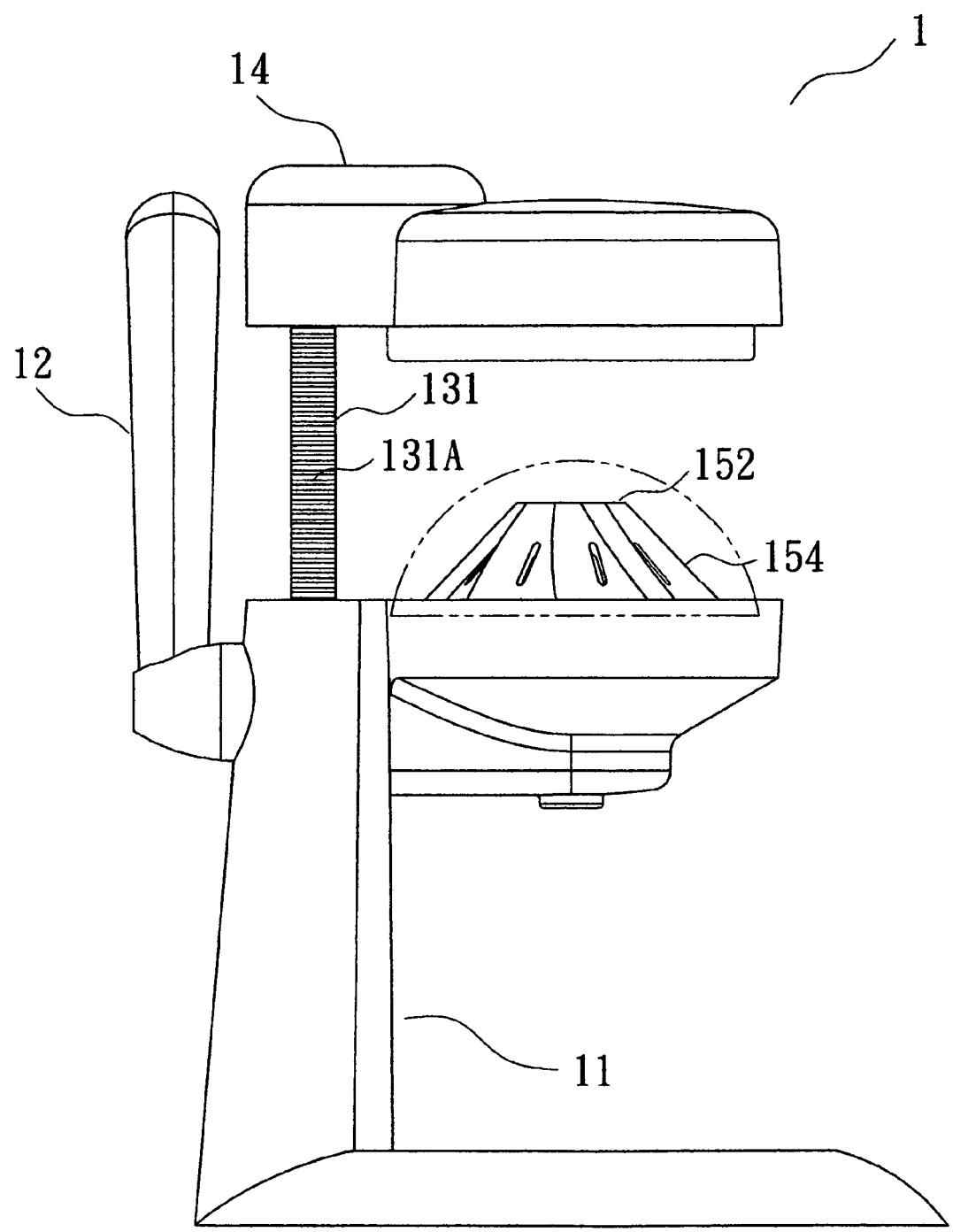
FIG. 6 is a top view showing usage status of the present invention.

A further description is made with reference to FIG. 6. Since the protrudent rib 154 of the protrudent part 153 comprises radian that provides a spiral rotary cutting result in the annular movement, the fruit is squeezed fully.

In conclusion, the advantages and features of the present invention are listed as follows:

1. The present invention provides a fruit squeezer to satisfy the requirement for squeezing fruit in a three-dimensional space in three directions (i.e. X, Y, Z axial directions) thereby squeezing the fruit juice out of the fruit fully.

2. The present invention accomplishes the process for squeezing the fruit by means of one action of rotating the rotating handle.

3. The preset invention further employs the protrudent rib of the protrudent part with radian to generate spiral rotary cutting and squeezing results during the squeezing process of the fruit thereby further squeezing the fruit juice out of the fruit.

In view of the description above, the present invention satisfies requirements for patentability namely utility, novelty, and nonobviousness. It is therefore submitted the present invention for a patent.

With the invention thus explained, it is apparent that various modifications and variations can be made without departing from the scope of the invention. It is therefore intended that the invention be limited only as indicated in the appended claims.

What is claimed is:

1. A fruit squeezer comprising:
    a base inside which a lateral rod is mounted and a first bevel gear having at least one protrudent driven wall on a side portion thereof is pivotally mounted;
    a rotating handle fixed to a first end of the lateral rod of a transmission member and exposed to the outside of the base;
    the transmission member comprising:
        an upright rack mounted inside the base; and
        the lateral rod having a gear corresponding to and engaging with the upright rack, and a second bevel gear corresponding to and engaging with the first bevel gear;
    a passive pressing cover fixed to the upright rack, the passive pressing cover having a cambered hollow trench on its bottom; and
    a passive rotating member mounted inside the base, the passive rotating member comprising a supporting plate on its upper portion and a corresponding trench on its lower portion corresponding to the protrudent driven wall, the supporting plate comprising a protrudent part corresponding to the cambered hollow trench, the protrudent part comprising at least one protrudent rib on its edge, wherein the passive pressing cover and the passive rotating member are driven by rotation of the rotating handle that drives the lateral rod to engage the gear and the second bevel gear of the lateral rod with the upright rack and the first bevel gear respectively.

2. The fruit squeezer of claim 1, wherein a fixing bracket for the lateral rod is mounted inside the base, and the fixing bracket comprises a through hole to allow the lateral rod to rotate inside the through hole.

3. The fruit squeezer of claim 1, wherein the protrudent rib has a radian.

4. The fruit squeezer of claim 1, wherein a protrudent sleeve having an upward opening is mounted inside the base to allow the first bevel gear to sleeve thereon.

5. The fruit squeezer of claim 1, wherein the passive rotating member further comprises a rotating plate below the supporting plate, and the corresponding trench is mounted on the bottom of the rotating plate to correspond to the protrudent driven wall and driven by the protrudent driven wall.

* * * * *